United States Patent
Walter et al.

(10) Patent No.: US 10,844,899 B2
(45) Date of Patent: Nov. 24, 2020

(54) BALL JOINT AND METHOD FOR MANUFACTURING A BALL JOINT

(71) Applicant: THK RHYTHM AUTOMOTIVE GMBH, Duesseldorf (DE)

(72) Inventors: Harald Walter, Duisburg (DE); Markus Ortmann, Willich (DE); Uwe Forthaus, Duesseldorf (DE)

(73) Assignee: THK RHYTHM AUTOMOTIVE GmbH, Düsseldorf (DE)

( * ) Notice: Subject to any disclaimer, the term of this patent is extended or adjusted under 35 U.S.C. 154(b) by 380 days.

(21) Appl. No.: 14/430,684

(22) PCT Filed: Sep. 25, 2013

(86) PCT No.: PCT/EP2013/069958
§ 371 (c)(1),
(2) Date: Mar. 24, 2015

(87) PCT Pub. No.: WO2014/048983
PCT Pub. Date: Apr. 3, 2014

(65) Prior Publication Data
US 2015/0240865 A1    Aug. 27, 2015

(30) Foreign Application Priority Data
Sep. 27, 2012   (DE) .................. 10 2012 019 043

(51) Int. Cl.
*F16C 11/06*    (2006.01)

(52) U.S. Cl.
CPC .......... *F16C 11/06* (2013.01); *F16C 11/0623* (2013.01); *F16C 11/0671* (2013.01);
(Continued)

(58) Field of Classification Search
CPC .............. F16C 11/0671; F16C 11/0623; F16C 11/0685; F16C 11/0695; F16C 11/06;
(Continued)

(56) References Cited

U.S. PATENT DOCUMENTS 3,135,539 A * 6/1964 Ulderup .............. F16C 11/0628
                                                      277/635
3,208,290 A * 9/1965 Mathues ............. F16C 11/0671
                                                      277/635
(Continued)

FOREIGN PATENT DOCUMENTS

DE     1266573 B    4/1968
DE     1294105 B    4/1969
(Continued)

OTHER PUBLICATIONS

German Search Report, Application No. 102012019043.3, dated Aug. 30, 2013.
(Continued)

*Primary Examiner* — Matthew R McMahon
(74) *Attorney, Agent, or Firm* — Westerman, Hattori, Daniels & Adrian

(57) ABSTRACT

In a ball joint with a housing, a ball stud which includes a ball head mounted in the housing, and with a sealing bellows which includes a ring-shaped housing-side connecting region, it is provided that at the housing a ring-shaped channel is provided, in which the housing-side connecting region is accommodated, wherein the outer radius of the channel at the channel bottom is greater than the outer radius at the free edge of the channel, and on the housing-side connecting region of the sealing bellows at least one holding element made of a rigid material is provided, which in particular in a top view in longitudinal direction of the ball stud is at least partly covered by the free edge of the channel.

17 Claims, 3 Drawing Sheets

(52) U.S. Cl.
CPC ...... *F16C 11/0685* (2013.01); *F16C 11/0695* (2013.01); *Y10T 29/4984* (2015.01); *Y10T 403/31* (2015.01); *Y10T 403/32729* (2015.01)

(58) Field of Classification Search
CPC .............. F16C 2326/05; F16C 2326/24; F16C 11/0628; F16C 11/0666; Y10T 403/32729; Y10T 403/31; Y10T 403/32737; F16J 3/042; B60G 2204/416; F16D 3/845
See application file for complete search history.

(56) References Cited

U.S. PATENT DOCUMENTS

| | | | | |
|---|---|---|---|---|
| 3,282,602 | A * | 11/1966 | Willingshofer | B60G 7/005 280/124.134 |
| 3,403,932 | A * | 10/1968 | Kutcher | F16C 11/06 277/391 |
| 3,545,797 | A * | 12/1970 | Korecky | F16C 11/0638 403/140 |
| 4,448,562 | A | 5/1984 | Rose | |
| 4,527,803 | A * | 7/1985 | Rose | F16C 11/0671 277/315 |
| 4,832,523 | A * | 5/1989 | Glatzel | F16C 33/145 277/635 |
| 4,921,368 | A * | 5/1990 | Busse | F16C 11/0671 277/634 |
| 5,078,531 | A * | 1/1992 | Sakai | F16C 11/0623 403/133 |
| 5,466,084 | A * | 11/1995 | Brueggen | F16C 11/0671 277/635 |
| 5,551,791 | A | 9/1996 | Schneider | |
| 5,601,378 | A * | 2/1997 | Fukukawa | F16C 11/0638 277/635 |
| 5,626,433 | A * | 5/1997 | Iwamoto | F16C 7/02 403/122 |
| 5,707,066 | A * | 1/1998 | Sugiura | F16D 3/845 277/634 |
| 6,042,294 | A * | 3/2000 | Urbach | B60G 3/20 403/122 |
| 6,093,108 | A * | 7/2000 | Moulinet | F16D 3/845 24/20 R |
| 6,293,873 | B1 * | 9/2001 | Iwano | F16D 3/845 277/636 |
| 6,443,461 | B1 * | 9/2002 | Hiraga | F16D 3/845 277/634 |
| 6,533,491 | B1 | 3/2003 | Redele | |
| 6,913,409 | B2 * | 7/2005 | Abels | B62D 7/16 403/122 |
| 6,926,612 | B2 * | 8/2005 | Wang | F16D 3/845 464/170 |
| 6,935,803 | B2 * | 8/2005 | Abels | B60G 7/005 277/634 |
| 7,063,331 | B2 * | 6/2006 | Iwano | F16D 3/845 277/634 |
| 7,097,568 | B2 * | 8/2006 | Kuczera | F16D 3/845 277/634 |
| 7,237,978 | B2 * | 7/2007 | Fischer | F16C 11/0671 277/635 |
| 7,244,074 | B2 * | 7/2007 | Abels | F16C 11/0671 277/634 |
| 7,441,979 | B2 * | 10/2008 | Heidemann | F16C 11/0671 403/134 |
| 8,256,980 | B2 * | 9/2012 | Walter | F16C 11/0695 280/93.511 |
| 8,851,785 | B1 * | 10/2014 | Belleau | F16C 11/0671 403/122 |
| 9,429,186 | B2 * | 8/2016 | Forthaus | F16C 11/0628 |
| 10,087,983 | B2 * | 10/2018 | Forthaus | F16C 11/0628 |
| 2004/0037621 | A1 * | 2/2004 | Suzuki | F16C 11/0647 403/135 |
| 2004/0265045 | A1 * | 12/2004 | Nachbar | F16C 11/0628 403/122 |
| 2005/0143180 | A1 * | 6/2005 | Johnson | F16D 3/845 464/173 |
| 2006/0182491 | A1 * | 8/2006 | Bernhardt | F16C 11/0671 403/134 |
| 2007/0173337 | A1 * | 7/2007 | Wormsbaecher | F16D 3/845 464/179 |
| 2012/0308295 | A1 * | 12/2012 | Ponukarin | F16C 11/0671 403/50 |

FOREIGN PATENT DOCUMENTS

| | | | | |
|---|---|---|---|---|
| DE | 9206847 | U1 | 7/1992 | |
| DE | 19850378 | C1 | 3/2000 | |
| DE | 69804504 | T2 | 11/2002 | |
| DE | 20216045 | U1 | 3/2004 | |
| EP | 1416175 | A2 * | 5/2004 | ......... F16C 11/0671 |
| JP | 2010138972 | A | 6/2010 | |
| WO | 94/23218 | A1 | 10/1994 | |
| WO | WO-2008108306 | A1 * | 9/2008 | ............ F16D 3/226 |

OTHER PUBLICATIONS

PCT International Preliminary Report on Patentability, Application No. PCT/EP2013/069958, dated Mar. 31, 2015.

* cited by examiner

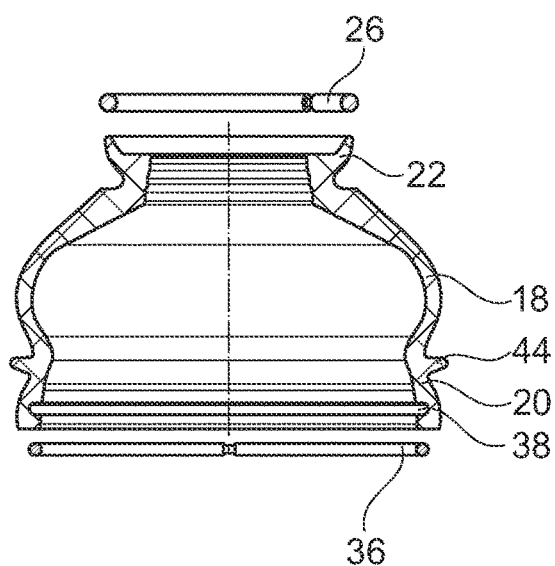
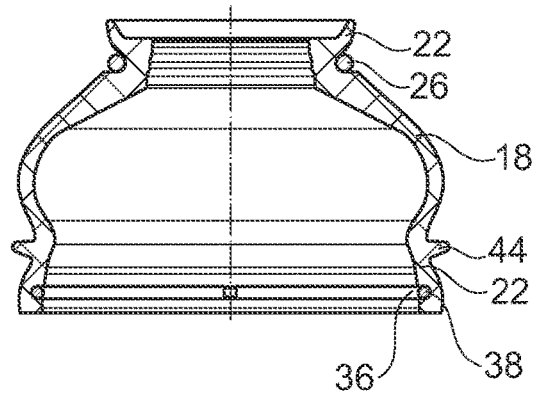
Fig. 3    Fig. 4
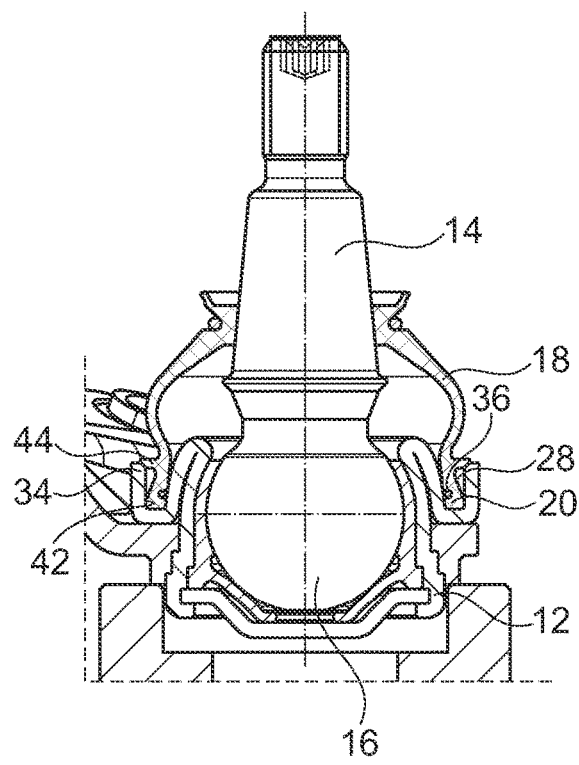
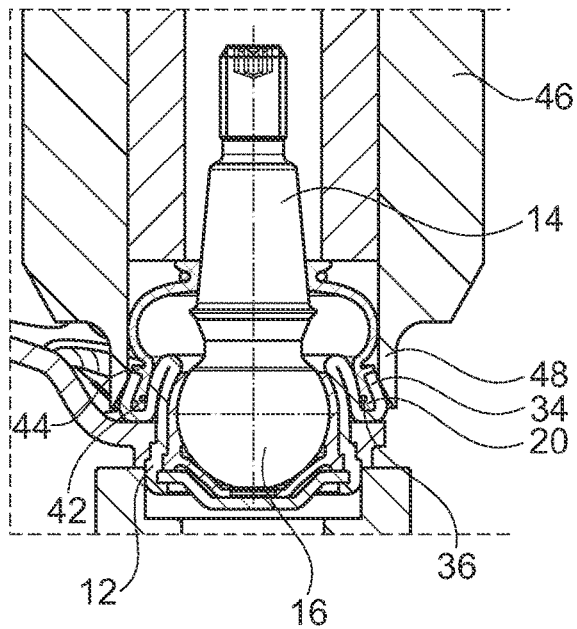
Fig. 5    Fig. 6

BALL JOINT AND METHOD FOR MANUFACTURING A BALL JOINT

CROSS-REFERENCE TO RELATED APPLICATIONS

This application is a national stage of International Application No. PCT/EP2013/069958 filed Sep. 25, 2013, the disclosures of which are incorporated herein by reference in entirety, and which claimed priority to German Patent Application No. 10 2012 019 043.3 filed Sep. 27, 2012, the disclosures of which are incorporated herein by reference in entirety.

BACKGROUND OF THE INVENTION

The invention relates to a ball joint with a housing, a ball stud which includes a ball head mounted in the housing, and with a sealing bellows which has a ring-shaped housing-side connecting region. The invention furthermore relates to a method for manufacturing a ball joint.

Ball joints frequently include a sealing bellows which prevents the ingress of dirt and moisture into the ball joint housing. The sealing bellows is formed hose-like and with a ball-stud-side connecting region tightly mounted on the ball stud, so that the ingress of moisture and dirt is prevented. With a second, housing-side connecting region the sealing bellows is tightly attached to the housing. The attachment usually is effected via a clamping ring or a claw ring which encloses the housing-side connecting region in circumferential direction and clamps the same against a ring-shaped region of the housing. The assembly of such clamping rings or claw rings, however, is very expensive. In addition, the holding function of these clamping or claw rings frequently is not sufficient.

BRIEF SUMMARY OF THE INVENTION

It is a feature of the invention to provide a ball joint with a sealing bellows which provides an improved sealing and a better holding effect of the sealing bellows. The feature of the invention furthermore is to provide a method for manufacturing such ball joint.

For the solution of the feature, a ring-shaped channel is provided in a ball joint of the type mentioned above, in which channel the housing-side connecting region is accommodated, wherein the outer radius of the channel at the channel bottom is greater than the outer radius at the free end of the channel. Furthermore, at least one holding element of a rigid material is provided at the housing-side connecting region of the sealing bellows, which in particular in a top view in longitudinal direction of the ball stud is at least partly covered by the free edge of the channel.

According to the invention, the clamping or attachment of the sealing bellows at the housing substantially is effected by form fit or by clamping the housing-side connecting region in the channel. This channel is formed ring-shaped and opened on an axial end face, so that the same can accommodate the ring-shaped connecting region of the sealing bellows. By the holding element which is provided at the sealing bellows an additional holding force is provided, in that said holding element is arranged such that due to being covered by the free edge of the channel, it cannot be pulled out of the channel in longitudinal direction. In the case of a tensile load in longitudinal direction, the connecting region of the sealing bellows additionally is clamped between holding element and channel and thus prevented from being pulled out. This provides an improved holding force. In addition, a labyrinth seal is provided by the channel, by which the potential flow path for liquids through the connecting region is lengthened, so that a better sealing of the sealing bellows is effected. Moreover, the effective sealing surface is increased substantially as compared to the prior art.

The holding element preferably is formed ring-shaped and extends in circumferential direction around the housing-side connecting region. This ensures a coverage with the free edge of the channel all around, so that the holding element cannot be pulled out of the channel either by shifting transversely to the longitudinal direction. "Extending annularly all around" here means that the holding element extends annularly in the channel, wherein the same can be arranged on the inside or the outside of the ring-shaped connecting region. In particular, the outer radius of the holding element is greater than the outer radius at the free edge of the channel, so that pulling the holding element out of the channel securely is excluded.

The holding ring for example can be a clamping ring, which can yield elastically, so that the same can provide an additional clamping effect by this spring action. In addition, the same can be deformed elastically by the spring action, so that a better adaptation of the holding element to the shape of the channel or the sealing bellows is possible.

It is also possible that several holding elements are provided, which are arranged distributed around the connecting region, wherein an improved holding effect can be achieved by the arrangement of the holding elements. In particular, the holding elements can be arranged uniformly distributed in circumferential direction.

The holding element alternatively can be provided on the inside or the outside of the housing-side connecting region of the sealing bellows. By an arrangement on the inside, for example, no additional clamping action is exerted on the connecting region, so that the same is not squeezed. An arrangement on the outside, on the other hand, provides for an additional clamping action by which an additional holding force can be provided.

For accommodating the holding element, a groove can be provided for example on the inside or the outside of the housing-side connecting region, in which the holding element is arranged. This creates a positive connection of the sealing bellows in longitudinal direction of the ball stud, so that in the case of a tensile load of the sealing bellows out of the channel the holding element cannot slip off the sealing bellows.

It is also conceivable that the holding element is cohesively or positively connected with the sealing bellows. In particular, the holding element can be arranged in the sealing bellows, for example by injection, vulcanizing or other known types of connection.

To lengthen the sealing path and position the same around the sealing bellows at the housing, a radially protruding web can be provided at the sealing bellows, which rests against the free edge of the channel in longitudinal direction of the ball stud, i.e. in axial direction with respect to the channel. In particular, the web can be provided to extend around the sealing bellows in circumferential direction.

The holding element is made of a material which is more rigid than the material of the sealing bellows. The material for example can be metal, plastics or rubber with a greater hardness than that of the material of the sealing bellows.

Preferably, the housing is formed integrally with the channel, whereby a more stable connection between channel and housing and thus between sealing bellows and housing is accomplished. In addition, this results in lower manufacturing costs.

The housing for example is made of sheet metal and the channel is formed by shaping the sheet metal.

According to the invention, there is furthermore provided a method for manufacturing a ball joint according to the invention, which includes the following steps: There is provided a housing with a channel which is formed substantially cylindrical and is open on an axial side. The ball stud is positioned in the housing. With the housing-side connecting region, the sealing bellows then is positioned in the channel of the housing. Subsequently, the radially outer wall of the channel is shaped, so that the outer radius of the channel at the channel bottom is greater than the outer radius at the free edge of the channel, and the holding element in particular in a top view in longitudinal direction of the ball stud is at least partly covered by the free edge of the channel.

The sealing bellows or the housing-side connecting region of the sealing bellows with the holding element can be introduced into the substantially cylindrically formed channel and be positioned in the same free from resistance. Only when the final position of the sealing bellows or the housing-side connecting region is reached, is the channel shaped such that a cohesive and/or positive connection with the connecting region is accomplished, whereby the same cannot be pulled out of the channel.

The sealing bellows for example is premounted on the ball stud, so that the sealing bellows can be mounted together with the ball stud.

Shaping of the channel can be effected by a punch which is shifted against the housing in longitudinal direction of the ball stud, wherein the punch in particular has a cone-shaped end which deforms the free end of the channel radially to the inside and thereby narrows the free end of the channel.

Other advantages of this invention will become apparent to those skilled in the art from the following detailed description of the preferred embodiments, when read in light of the accompanying drawings.

BRIEF DESCRIPTION OF THE DRAWINGS

FIG. 3 shows a first mounting step of the ball joint of FIG. 1,
FIG. 4 shows a second mounting step of the ball joint of FIG. 1,
FIG. 5 shows a third mounting step of the ball joint of FIG. 1,
FIG. 6 shows a fourth mounting step of the ball joint of FIG. 1.

DETAILED DESCRIPTION OF THE INVENTION

Figure 1:
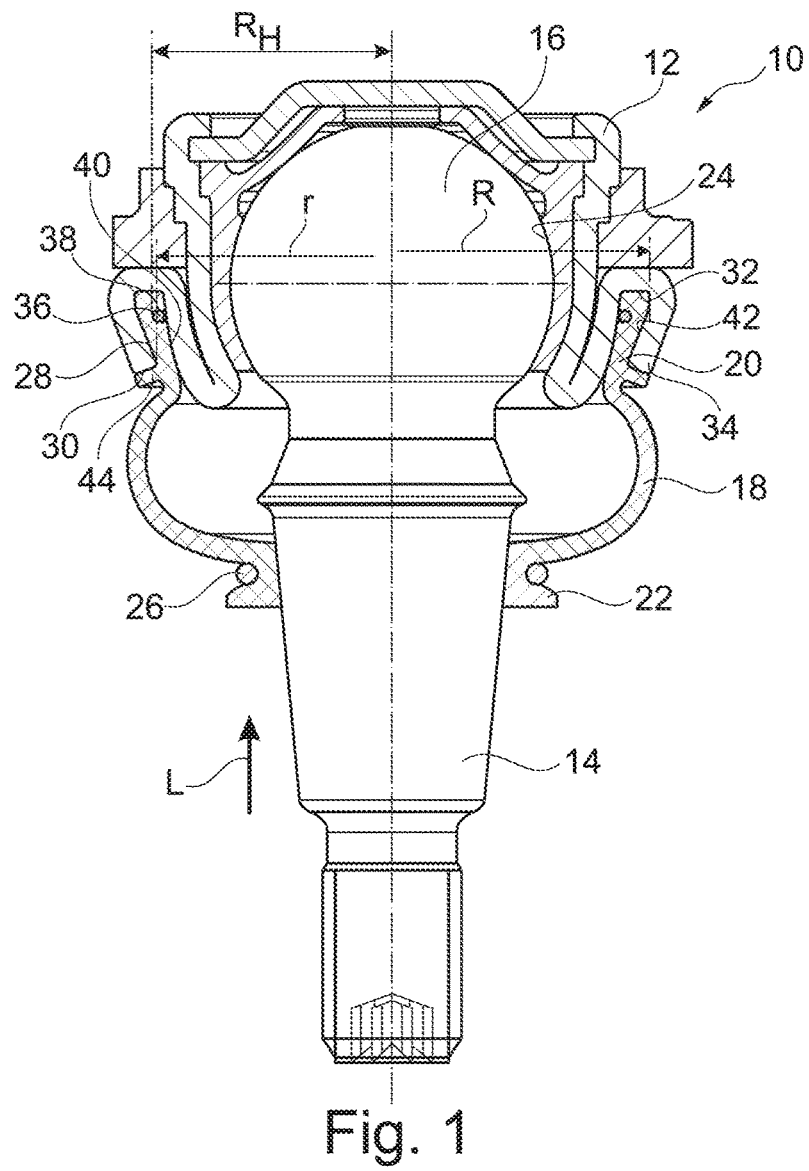
FIG. 1 shows a sectional view of a ball joint according to the invention.

FIG. 1 shows a ball joint 10 with a housing 12 in which a ball stud 14 with a ball head 16 is mounted. The ball joint 10 furthermore includes a sealing bellows 18 which with a housing-side connecting region 20 is tightly attached to the housing 12 and with a ball-stud-side connecting region 22 tightly rests against the ball stud 14 all around. The sealing bellows 18 prevents the ingress of dirt and water into the housing 12, so that a low-friction bearing of the ball head 16 on a sliding surface 24 of the housing 12 is possible.

Both the housing-side connecting region 20 and the ball-stud-side connecting region 22 are formed ring-shaped and enclose the ball stud 14 in circumferential direction.

The ball-stud-side connecting region 22 all around is pressed against the ball stud 14 by a circlip 26, so that the same tightly rests against the ball stud 14.

Figure 2:
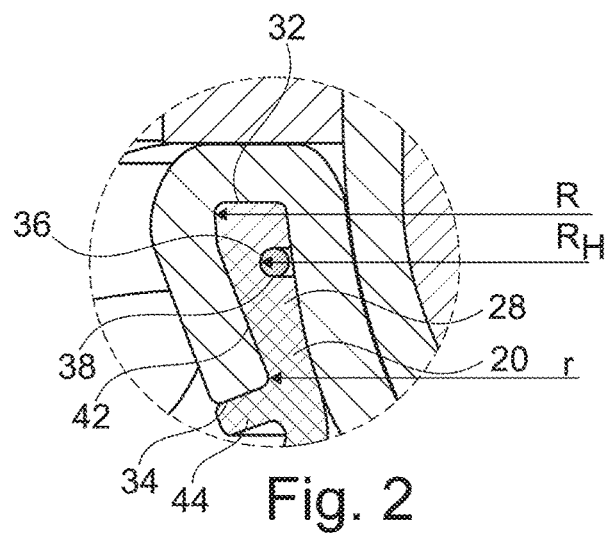
FIG. 2 shows a detail view of the ball joint of FIG. 1.

For accommodating the housing-side connecting region 20 a ring-shaped channel 28 is provided at the housing 12, which is formed integrally with the housing 12. As can be seen in FIGS. 1 and 2, the channel 28 is open on an end face 30 pointing away from the housing 12, so that the sealing bellows 18 can protrude into the channel 28 with the housing-side connecting region 20.

The housing 12 is made of sheet metal integrally with the channel 28, wherein the channel 28 is formed by shaping the sheet metal, whereby a secure connection between sealing bellows 18 and housing 12 is accomplished.

The housing-side connecting region 20 is conically flared towards the housing 12. The channel 28 is formed such that the same positively holds or clamps the housing-side connecting region 20, so that pulling off the sealing bellows 18 against a longitudinal direction L of the ball stud 14 is not possible. For this purpose, the outer wall 42 of the channel 28 likewise is formed conical, wherein the outer radius R at the channel bottom 32 is greater than the outer radius r at the free edge 34 of the channel 28.

As can be seen in particular in FIG. 2, a holding element 36 furthermore is provided at the housing-side connecting region 20, which in the illustrated embodiment is formed by an annularly extending metal ring. On the inside 40 of the housing-side connecting region 20 a circumferential groove 38 is provided for the holding element 36, in which the holding element 36 is positively accommodated.

As can be seen in particular in FIG. 2, the outer radius $R_H$ of the holding element 36 is so large that the holding element 36 as seen in longitudinal direction L of the ball stud 14 partly is covered by the free edge 34 of the channel 28. The outer radius $R_H$ of the holding element 36 thus is greater than the outer radius r at the free end 34 of the channel 28.

The sealing bellows 18 or the housing-side connecting region 20 is held by the positive and non-positive connection between channel 28 and housing-side connecting region 20.

The holding element 36 additionally provides a holding force, as with a tensile force against the longitudinal direction L the holding element 36 is urged against the outer wall 42 or the free edge 34, wherein the housing-side connecting region 20 is urged against the same or clamped between the same and the holding element 36.

Since the radius $R_H$ of the holding element 36 is greater than the outer radius r at the free edge 34 of the channel 28, the holding element 36 and thus the housing-side connecting region cannot be pulled out of the channel 28, so that a reliable attachment of the sealing bellows 18 is ensured.

Due to the lengthened flow path, there is also provided a labyrinth seal by which a very good sealing between housing 12 and housing-side connecting region 20 is effected.

To additionally lengthen the flow path and to ensure a reliable fit of the housing-side connecting region 20, a circumferential, radially protruding web 44, which rests against the free edge 34 of the channel 28, is provided on the sealing bellows 18 at the transition to the housing-side connecting region 20.

The assembly of the ball joint 10 shown in FIGS. 3 to 6.

In a first mounting step, the circlip 26 and the holding element 36 are mounted on the sealing bellows 18 (FIGS. 3 and 4). At this time, the sealing bellows 18 can be pre-mounted already on the ball stud 15, so that the sealing bellows 18 and the ball stud 14 form a premounted unit.

Subsequently, the ball stud 14 with the ball head 16 is inserted into the housing 12 and the housing-side connecting region 20 is introduced into the channel 28, until the web 44 rests against the outer wall 42 or the free edge 34.

As can be seen in FIG. 5, in a premounted condition the channel 28 or the outer wall 42 are formed substantially cylindrical and not conically tapered. This means that the outer wall 42 substantially extends in longitudinal direction L.

Subsequently, the free edge 34 or the outer wall 42 of the channel 28 is shaped radially to the inside, so that the outer radius r at the free edge 34 is smaller than the outer radius R at the channel bottom 32.

The connecting region 20 either can be clamped or there can merely be accomplished a positive connection between the housing-side connecting region 20 and the outer wall 42 or the channel 28.

The free edge 34 merely must be bent over to such an extent that a partial coverage of the free edge 34 and the holding element 36 is present in longitudinal direction L.

To bend the outer wall 42 over with little effort, a tool with a punch 46 is used, which can be shifted in longitudinal direction L (FIG. 6). The punch 46 is formed substantially cylindrical, with a substantially ring-shaped end 48, whose inner wall conically tapers against the longitudinal direction L, i.e. away from the housing 12.

The end 48 is put onto the free edge 34 of the outer wall 42 and the punch 46 is moved against the housing 12. The free edge 34 is urged radially to the inside by the conical region of the end 48, so that the outer radius r of the free edge 34 is reduced.

Independent of the embodiment shown, the number and the shape of the holding elements 36 can be varied as desired. It must merely be ensured that in a top view in longitudinal direction L of the ball stud 14 the holding elements are at least partly covered by the free edge 34 of the channel 28. In particular, it is conceivable that several holding elements 36 distributed in circumferential direction are provided.

Figure 7:
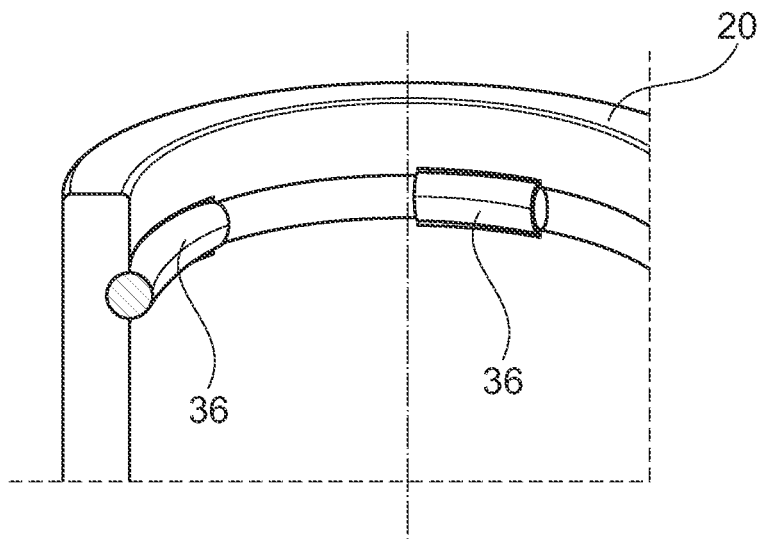
FIG. 7 shows a detail view of a second embodiment of a sealing bellows for a ball joint according to the invention.
Figure 8:
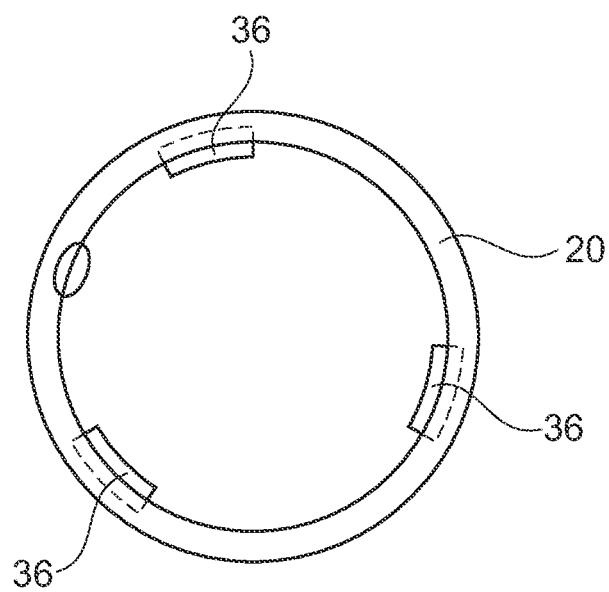
FIG. 8 shows a sectional view through the housing-side connecting region of the sealing bellows of FIG. 7.

A second embodiment of a sealing bellows 18 for a ball joint 10 according to the invention is shown in FIGS. 7 and 8. In this embodiment, the holding elements 36 are plastic elements which are injection-molded into the housing-side connecting region 20 of the sealing bellows 18, i.e. cohesively connected with the same. The holding elements 36 are uniformly distributed on the inner circumference of the housing-side connecting region 20 (see FIG. 8).

In this embodiment, the holding elements 36 are made of plastics. The material of the holding elements 36 can be varied, however, as desired. It must merely be ensured that the material of the holding elements 36 is more rigid than the material of the sealing bellows 18. The material for example can be metal, plastics or a rubber material whose hardness is higher than the hardness of the sealing bellows 18.

Other than in the embodiments shown here, the holding element 36 also can be arranged on the outer circumference of the housing-side connecting region 20 or be enclosed completely by the material of the sealing bellows 18. The holding element 36 for example also can be a clamping ring which provides an additional holding force.

In accordance with the provisions of the patent statutes the principle and mode of operation of this invention have been explained and illustrated in its preferred embodiments. However, it must be understood that this invention may be practiced otherwise than as specifically explained and illustrated without departing from its spirit or scope.

The invention claimed is:

1. A ball joint with a housing, a ball stud which includes a ball head mounted in the housing, and with a sealing bellows which includes a ring-shaped housing-side connecting region, wherein
    the housing is made from sheet metal and formed from one piece, wherein the sheet metal forming the housing has a meander shape,
    and wherein at the housing a ring-shaped channel is provided, in which the housing-side connecting region is accommodated, wherein an outer radius of the channel at a channel bottom is greater than an outer radius at a free edge of the channel, wherein the channel is opened only on an axial end face,
    said channel having an inner wall which is formed from a layer of sheet metal from which said housing is formed, said layer forming the inner wall of said channel being an outer layer of a double-layer structure of said housing, wherein the layer forming the inner wall of the channel has a convex shape over its entire length from the channel bottom to the axial end face, and
    at the housing-side connecting region of the sealing bellows at least one holding element made of a rigid material is provided, which in a top view in a longitudinal direction of the ball stud is at least partly covered by the free edge of the channel.

2. The ball joint according to claim 1, wherein the holding element is formed ring-shaped and extends in a circumferential direction around the housing-side connecting region, wherein an outer radius of the holding element is greater than the outer radius at the free edge of the channel.

3. The ball joint according to claim 2, wherein the holding element is a clamping ring.

4. The ball joint according to claim 1, wherein several holding elements are provided, which are uniformly distributed in a circumferential direction.

5. The ball joint according to claim 1, wherein the holding element is provided on an inside or an outside of the housing-side connecting region of the sealing bellows.

6. The ball joint according to claim 5, wherein on the inside or the outside of the housing-side connecting region a groove is provided, in which the holding element is arranged.

7. The ball joint according to claim 1, wherein the holding element is cohesively or positively connected with the sealing bellows.

8. The ball joint according to claim 1, wherein the sealing bellows includes a radially protruding web extending in a circumferential direction, which in the longitudinal direction of the ball stud rests against an outer wall of the channel.

9. The ball joint according to claim 1, wherein the holding element is made of metal, plastics or rubber.

10. The ball joint according to claim 1, wherein the housing is formed integrally with the channel.

11. The ball joint according to claim 1, wherein the channel is formed from plastically deformed sheet metal and has a u-shape in cross section with only an axial opening area and a decreasing cross-sectional area from the channel bottom to the axial opening area.

12. The ball joint according to claim 1, wherein the layer forming the inner wall of the channel is curved in the longitudinal direction over its entire length from the channel bottom to the axial end face such as to follow a curved path around a center of the ball.

13. A method for manufacturing a ball joint according to claim 1, with the following steps:
    providing the housing with the channel which is formed substantially cylindrical and is open on an axial side,
    positioning the ball stud in the housing,
    positioning the sealing bellows with the housing-side connecting region in the channel of the housing, and
    shaping of a radially outer wall of the channel, so that the outer radius of the channel at the channel bottom is greater than the outer radius at the free edge of the channel, and the holding element in the top view in the longitudinal direction of the ball stud is at least partly covered by the free edge of the channel.

14. The method according to claim 13, wherein the sealing bellows is premounted on the ball stud.

15. The method according to claim 13, wherein for shaping the channel a punch is used, which is shifted against the housing in the longitudinal direction of the ball stud, wherein the punch has a cone-shaped end.

16. A ball joint with a housing, a ball stud which includes a ball head mounted in the housing, and with a sealing bellows which includes a ring-shaped housing-side connecting region, wherein
    at the housing a ring-shaped channel is provided, in which the housing-side connecting region of the sealing bellows is accommodated, wherein an outer radius of the channel at a channel bottom is greater than an outer radius at a free edge of the channel,
    said channel having an outer wall which is formed from a single layer of sheet metal from which said housing is formed,
    said channel having an inner wall which is formed from a layer of sheet metal from which said housing is formed, said layer forming the inner wall of said channel being an outer layer of a double-layer structure of said housing,
    wherein the channel is open only on an axial end face, and
    wherein a free end of the sheet metal forming the housing is part of the single layer outer wall of the channel and wherein the free end is positioned at the open axial end face of the channel.

17. A ball joint with a housing, a ball stud, and a sealing bellows,
    said ball stud having a stud portion and a ball head, said ball head being received within said housing,
    said housing being formed from sheet metal, said sheet metal having a double-layer structure at the side at which the ball head is joined to the stud portion, said double-layer structure being formed from folded sheet metal,
    said housing having a circumferentially extending channel open in an axial direction towards said stud portion,
    said channel being formed integrally from said sheet metal forming said housing, an outer wall of said channel being formed from a single layer of sheet metal and an inner wall of said channel being formed by an outer wall of said double-layer structure, wherein a free end of the sheet metal forming the housing is part of the single layer outer wall of the channel and wherein the free end is positioned at an open axial end face of the channel,
    said sealing bellows having a ring-shaped housing-side connecting region which is received in said channel formed from sheet metal.

\* \* \* \* \*